UNITED STATES PATENT OFFICE.

EDWARD D. FROHMAN, OF PITTSBURG, PENNSYLVANIA.

BINDER FOR SAND-CORES, BRIQUETS, &c.

No. 903,558.        Specification of Letters Patent.        Patented Nov. 10, 1908.

Application filed November 30, 1907. Serial No. 404,635.

*To all whom it may concern:*

Be it known that I, EDWARD D. FROHMAN, a resident of Pittsburg, in the county of Allegheny and State of Pennsylvania, have invented a new and useful Improvement in Binders for Sand-Cores, Briquets, &c.; and I do hereby declare the following to be a full, clear, and exact description thereof.

This invention relates to a composition to be used as binders for sand cores in foundries, in the making of briquets of all kinds, and for all purposes in which finely divided material is desired to be bound together preparatory to further operations for various purposes.

In the making of sand cores in foundries, the briqueting of fine material, such as coal dust or slack, coke breeze, iron ore and the like, and also in the manufacture of various kinds of brick made from highly refractory materials, it is the practice to mix with the sand or other material some sticky or viscous matter which serves to bind the finely divided material together so that when molded it retains its shape preparatory to baking, burning, or other further operation.

My invention provides a comparatively cheap and effective binder for all of these purposes and one which does not introduce into the materials which are bound together thereby any ingredient which is injurious in the further operations to which the core, briquet or brick is subjected.

The improved binder consists in a composition composed of the juices of various plants, or residuums thereof, treated with an alkali. Preferably it is composed of a cheap grade of molasses, such as that commonly known as "black strap" either produced from cane or beet, treated with lime, preferably in the form of a solution, such as hydrate of lime or milk of lime. The lime may be added directly without hydrating, but preferably will be hydrated and added to the molasses until the latter is practically saturated. I have found about two per cent. of hydrate of lime to be a satisfactory proportion. The mixture, if cold, will be agitated to thoroughly distribute the lime throughout the molasses, but by boiling artificial agitation may be dispensed with, as the ebullition produces sufficient agitation.

The result of treating the molasses with the lime imparts to the molasses a deeper or darker color and also thickens the same and greatly increases its viscousness and stickiness, thus adapting it admirably as a binder for finely divided materials such as mentioned. The composition remains liquid and can be shipped in barrels and stored for any length of time, as is usual with binders in foundry practice. The binder is used in the ordinary way by mixing with the sand, fine iron ore, coal, coke, or other material from which the briquet is to be formed, or mixing with the granulated silica or other ingredients from which fire resisting brick or the like are to be molded. After proper mixture the sand or other material is molded or briqueted in the usual way and then subjected to baking, drying, burning or other usual operations.

In place of the molasses I can use any other thick residuum of plant juices, all of which are more or less viscous. The residuums of sugar and syrup manufactories are well adapted for the purpose. Ordinary black strap molasses, however, which is the residuum of sugar and syrup factories, whether from cane or beet sugar, is the most common and therefore the preferred material. Any other alkali may be used in place of the lime but on account of the cheapness of the latter it is preferred.

I do not limit myself to the percentage of lime above mentioned, as experience may show that this can be varied within wide limits without departing from the spirit of the invention.

What I claim is:

1. A liquid composition for use as binders for finely divided material, composed entirely of the thick residuum of plant juices treated with a small percentage of an alkaline substance.

2. A liquid composition for use as binders for finely divided material, composed entirely of a saccharine liquid treated with a small percentage of an alkaline substance.

3. A liquid composition for use as binders for finely divided material, composed entirely of molasses treated with a small percentage of an alkaline substance.

4. A liquid composition for binders for use as finely divided material, consisting solely of the residuum of plant juices treated with a small percentage of lime in solution.

5. A liquid composition for use as binders for finely divided material, composed entirely of molasses treated with a small percentage of lime in solution.

6. A liquid composition for use as binders for finely divided material, consisting of the thick residuum of plant juices treated with an alkali, the alkali not exceeding four per cent. of the composition.

7. A liquid composition for binders for finely divided material, composed of the residuum of plant juices treated with lime, the lime not exceeding four per cent. of the composition.

8. A liquid composition for use as binders for finely divided material, composed of molasses treated with an alkali, the alkali not exceeding four per cent. of the composition.

9. A liquid composition for use as binders for finely divided material, composed of molasses treated with lime, the lime not exceeding four per cent. of the composition.

In testimony whereof, I the said EDWARD D. FROHMAN have hereunto set my hand.

EDWARD D. FROHMAN.

Witnesses:
F. W. WINTER,
ROBERT C. TOTTEN.